United States Patent [19]

Matsunaga et al.

[11] Patent Number: 4,543,612

[45] Date of Patent: Sep. 24, 1985

[54] FACSIMILE SYSTEM

[75] Inventors: Shigeo Matsunaga, Yokohama; Yoshio Iizuka, Sagamihara; Tadaaki Suzuki, Kawasaki, all of Japan

[73] Assignee: Fujitsu Limited, Kawasaki, Japan

[21] Appl. No.: 453,100

[22] Filed: Dec. 27, 1982

[30] Foreign Application Priority Data

Dec. 29, 1981 [JP] Japan .................. 56-213573

[51] Int. Cl.⁴ .............................................. H04N 1/41
[52] U.S. Cl. ............................. 358/261; 340/347 DD
[58] Field of Search ................ 358/261; 340/347 DD

[56] References Cited

U.S. PATENT DOCUMENTS

| | | | |
|---|---|---|---|
| 3,471,639 | 10/1969 | Centanni | 358/261 |
| 3,474,442 | 10/1969 | Centanni | 358/261 |
| 3,510,576 | 5/1970 | Centanni | 358/261 |
| 3,560,639 | 2/1971 | Centanni | 358/261 |
| 4,121,259 | 10/1978 | Preuss | 358/261 |
| 4,311,989 | 1/1982 | Roux | 358/261 |
| 4,312,018 | 1/1982 | Nakajiri | 358/261 |
| 4,334,246 | 1/1982 | Saran | 358/261 |
| 4,386,373 | 5/1983 | Kondo | 358/261 |

FOREIGN PATENT DOCUMENTS 2552751 3/1977 Fed. Rep. of Germany .
2441297 6/1980 France .

Primary Examiner—Howard W. Britton
Attorney, Agent, or Firm—Staas & Halsey

[57] ABSTRACT

A facsimile system comprises a data compression circuit for generating a run length, a ROM table for coding a run length into compressed data, and a comparator. The comparator compares given compressed data with a sequence of compressed data transmitted from the data compression circuit. When a match occurs therebetween, reproduced data or run-length data for the given compressed data is obtained in the data compression circuit.

6 Claims, 23 Drawing Figures

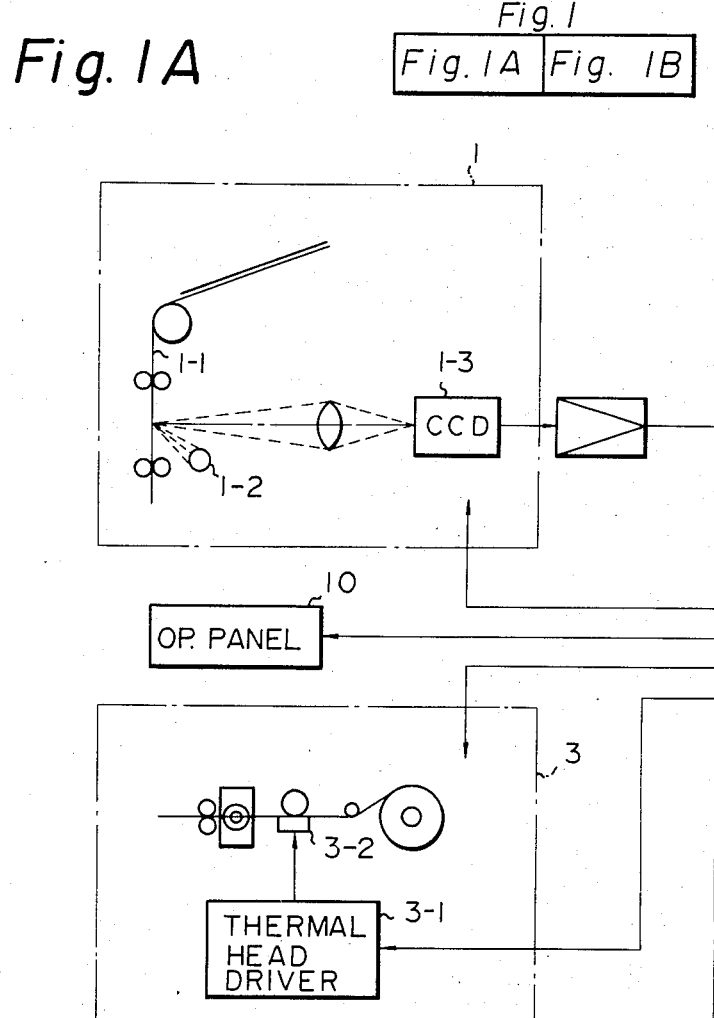

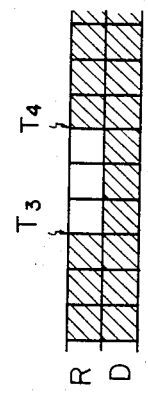
Fig. 2A P MODE
Fig. 2B V₀ MODE
Fig. 2C V_R MODE
Fig. 2D V_L MODE
Fig. 2E H MODE

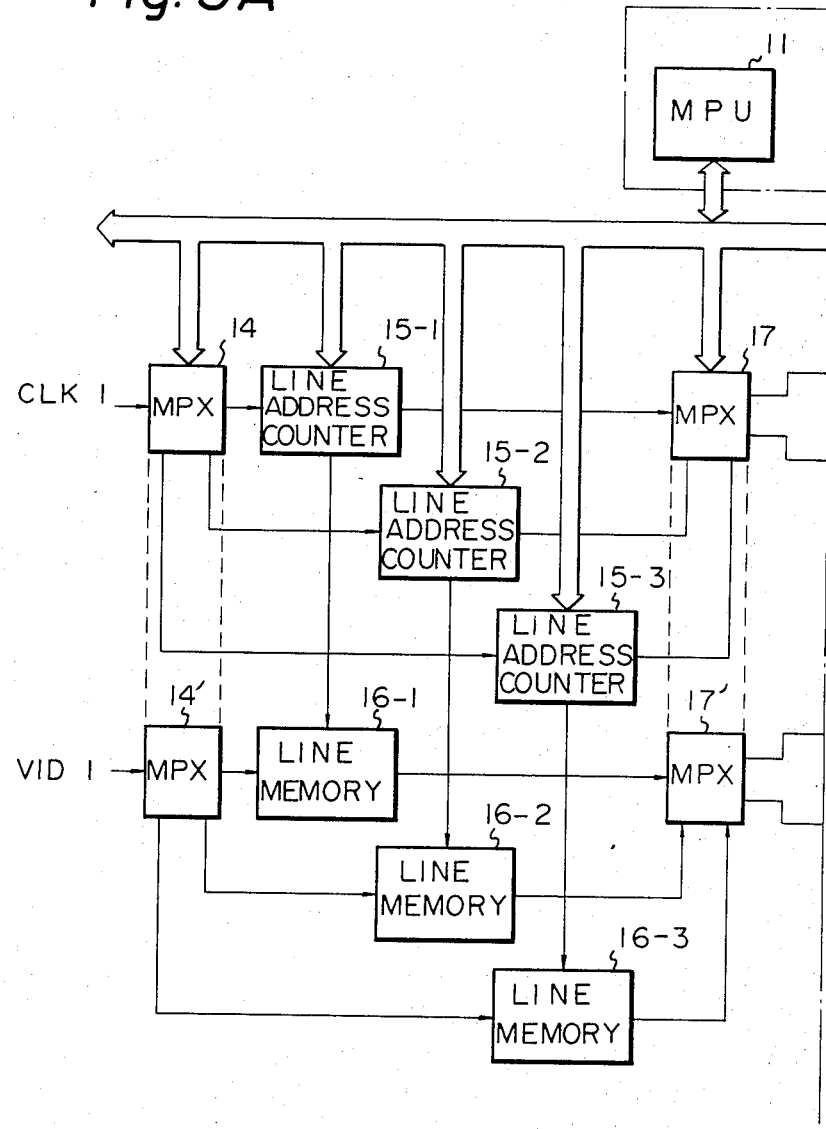

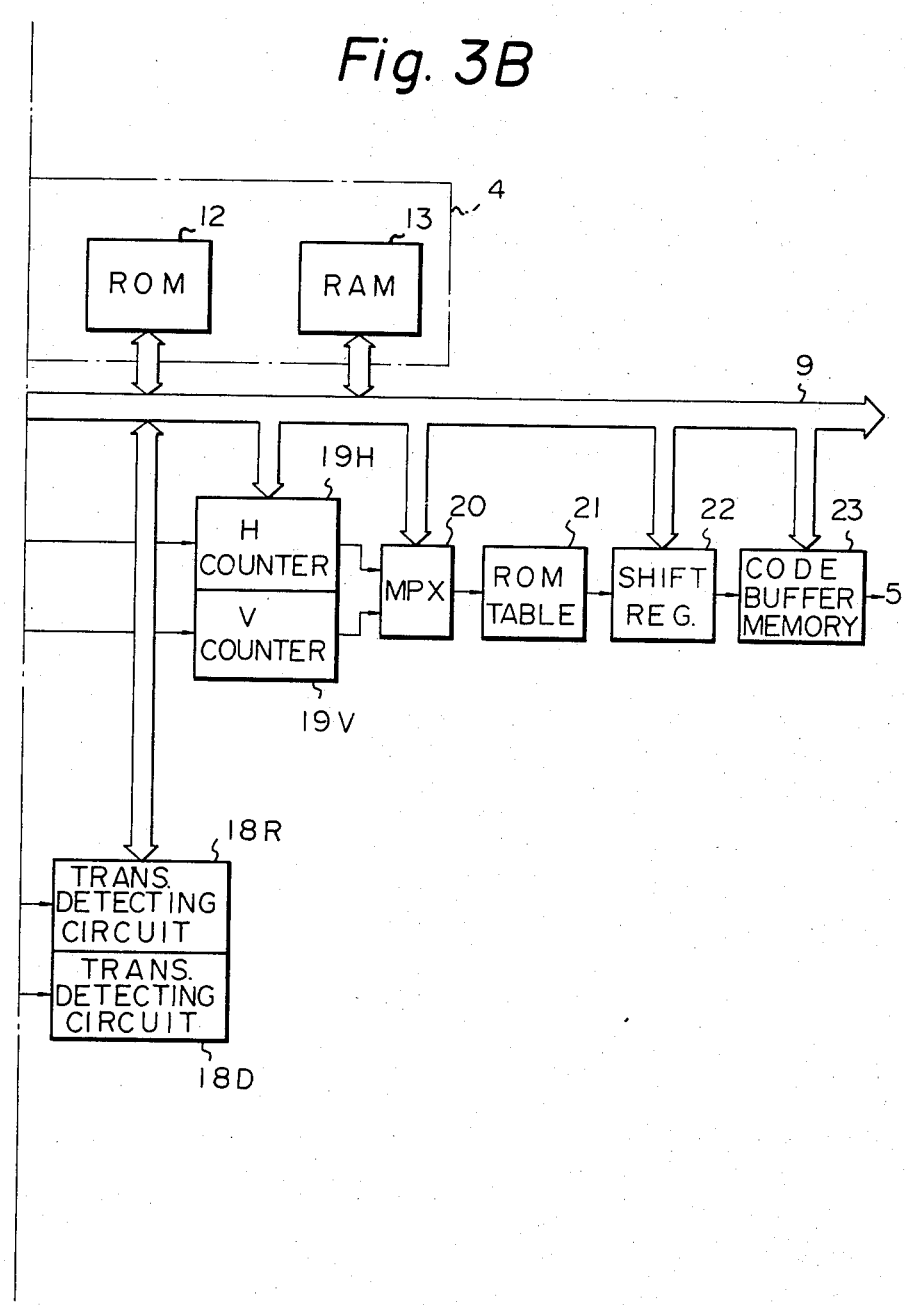

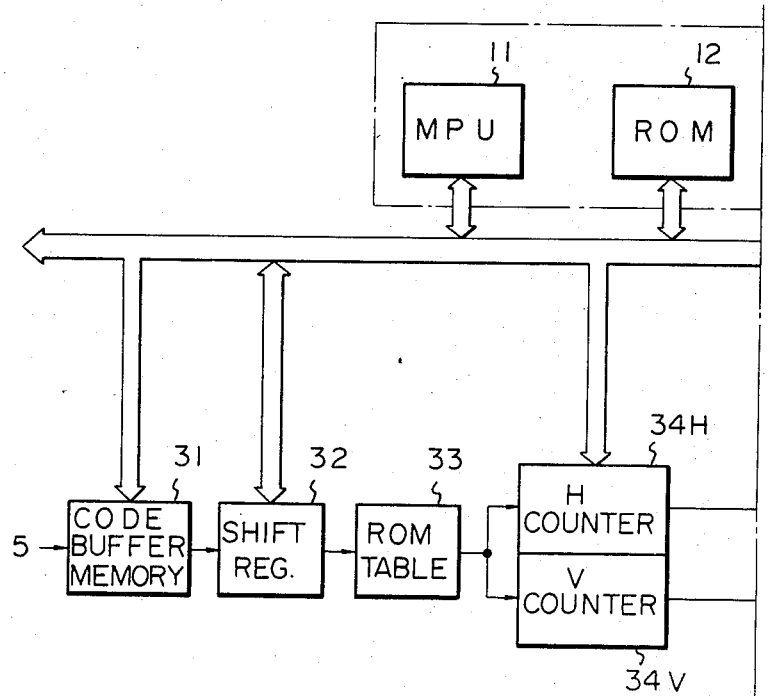

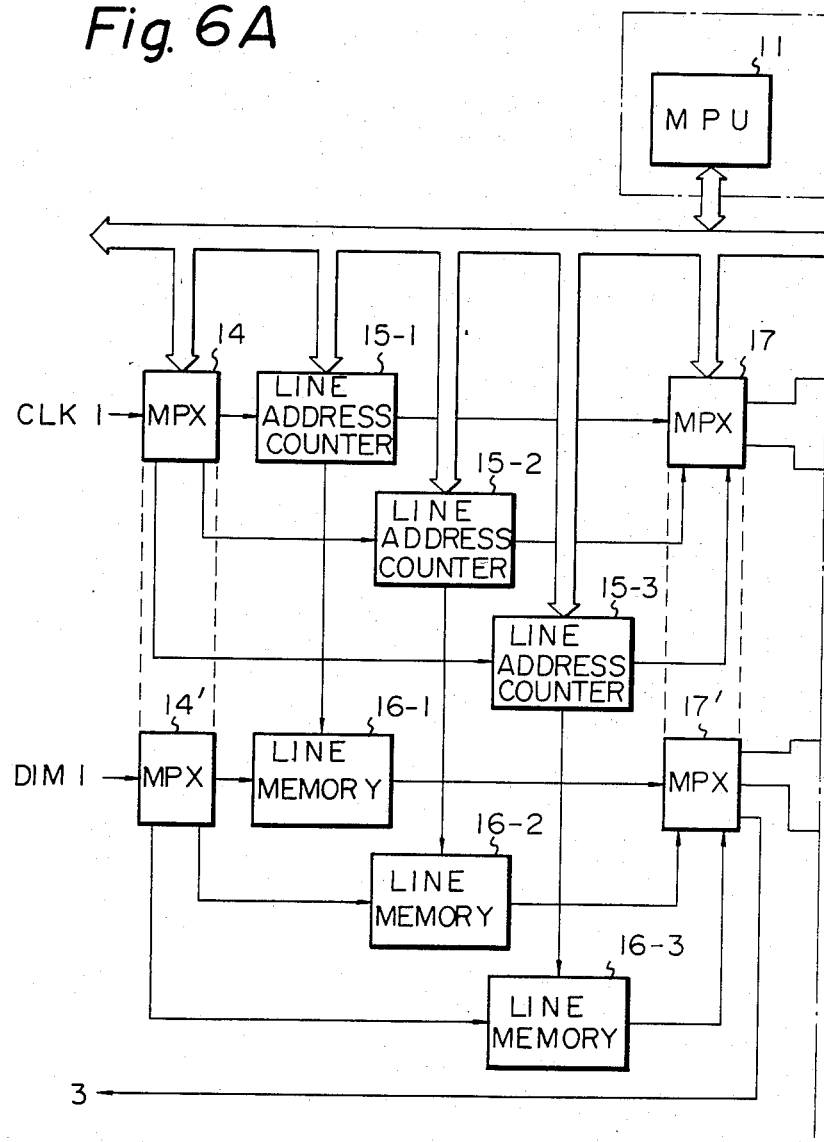

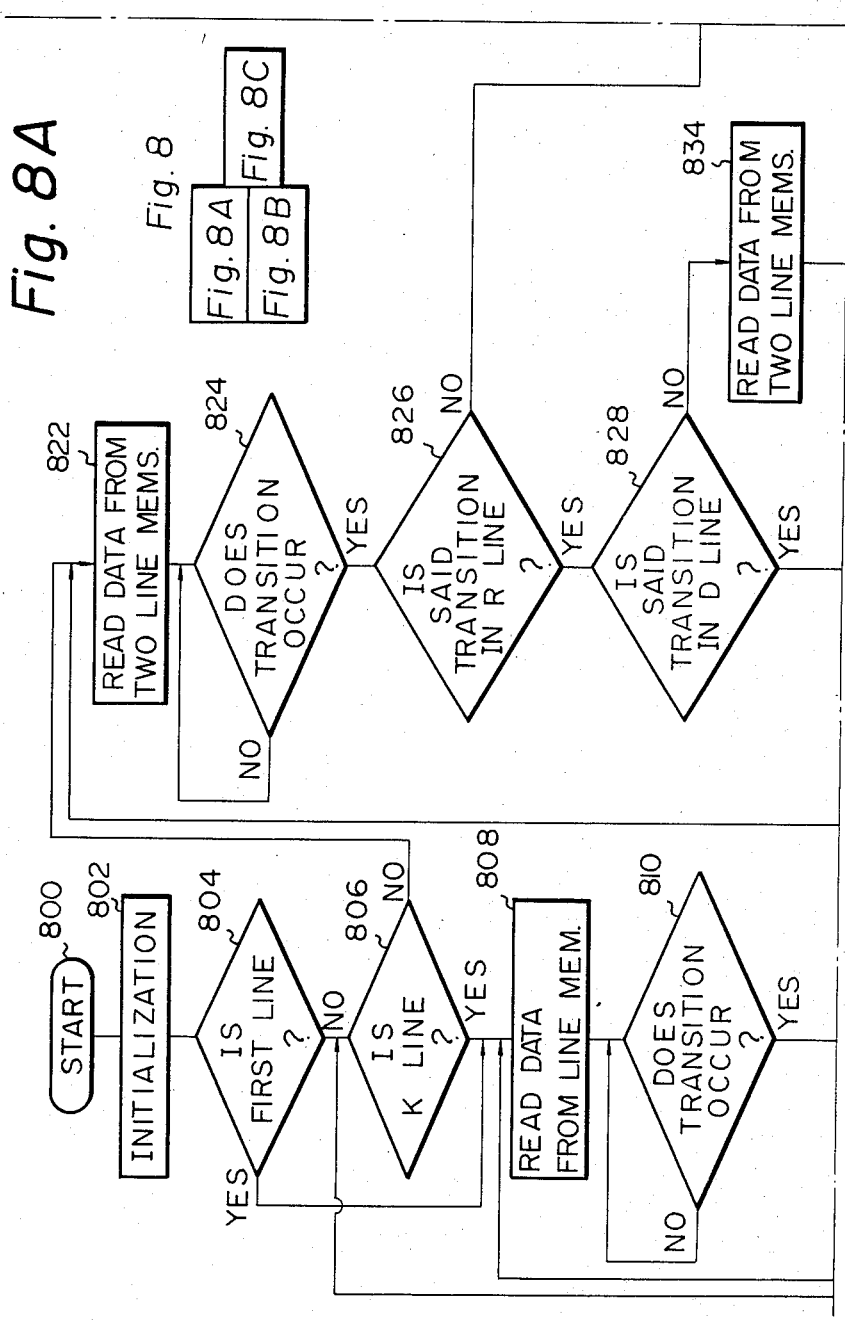

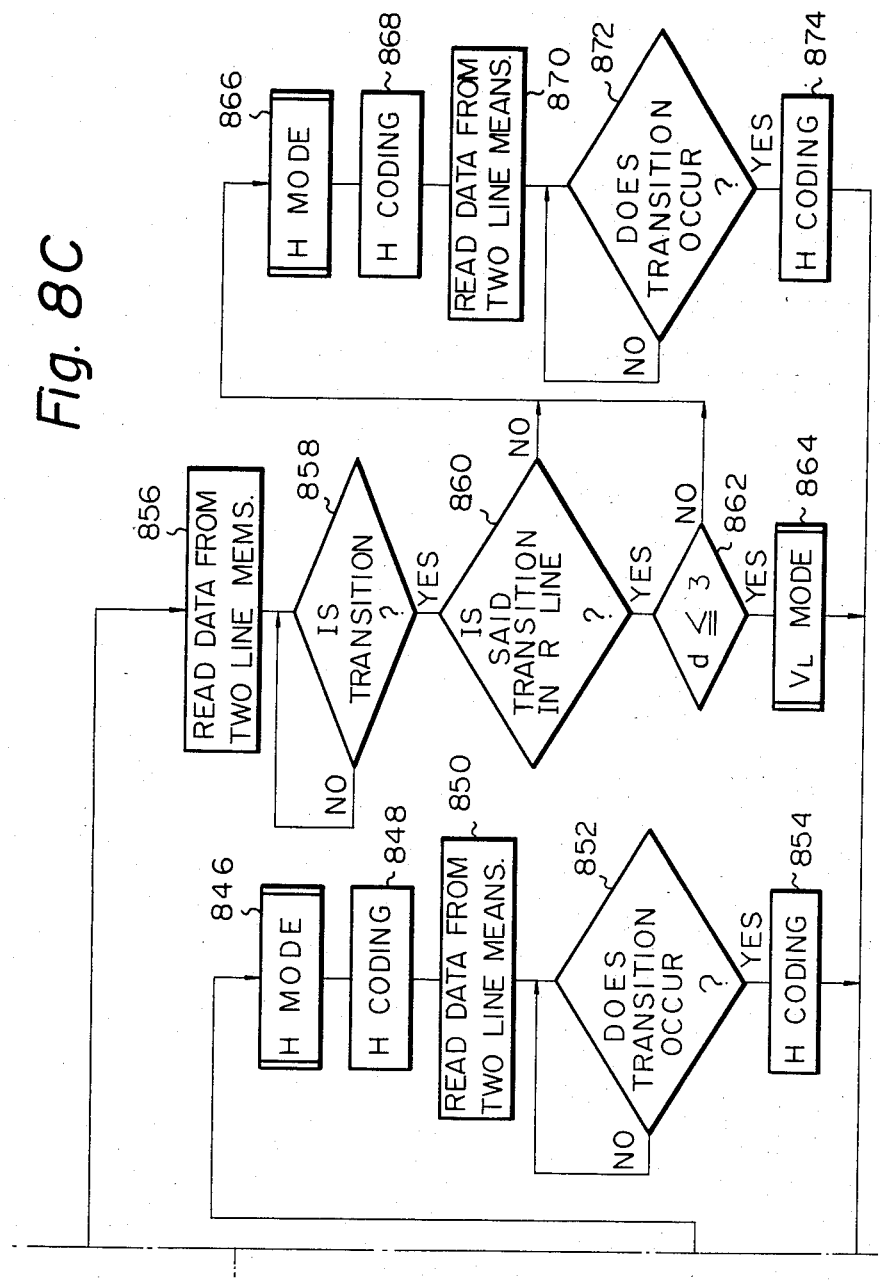

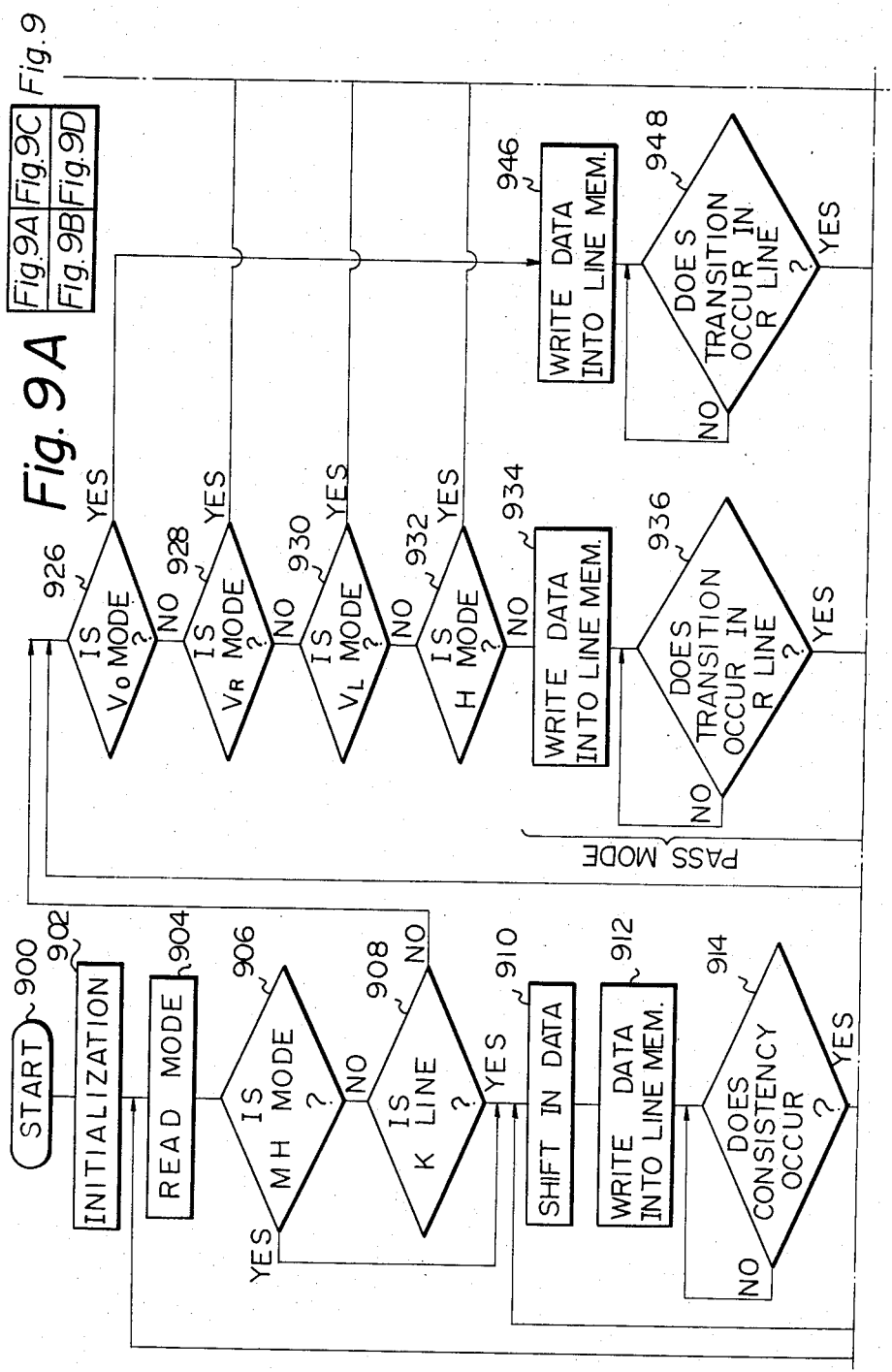

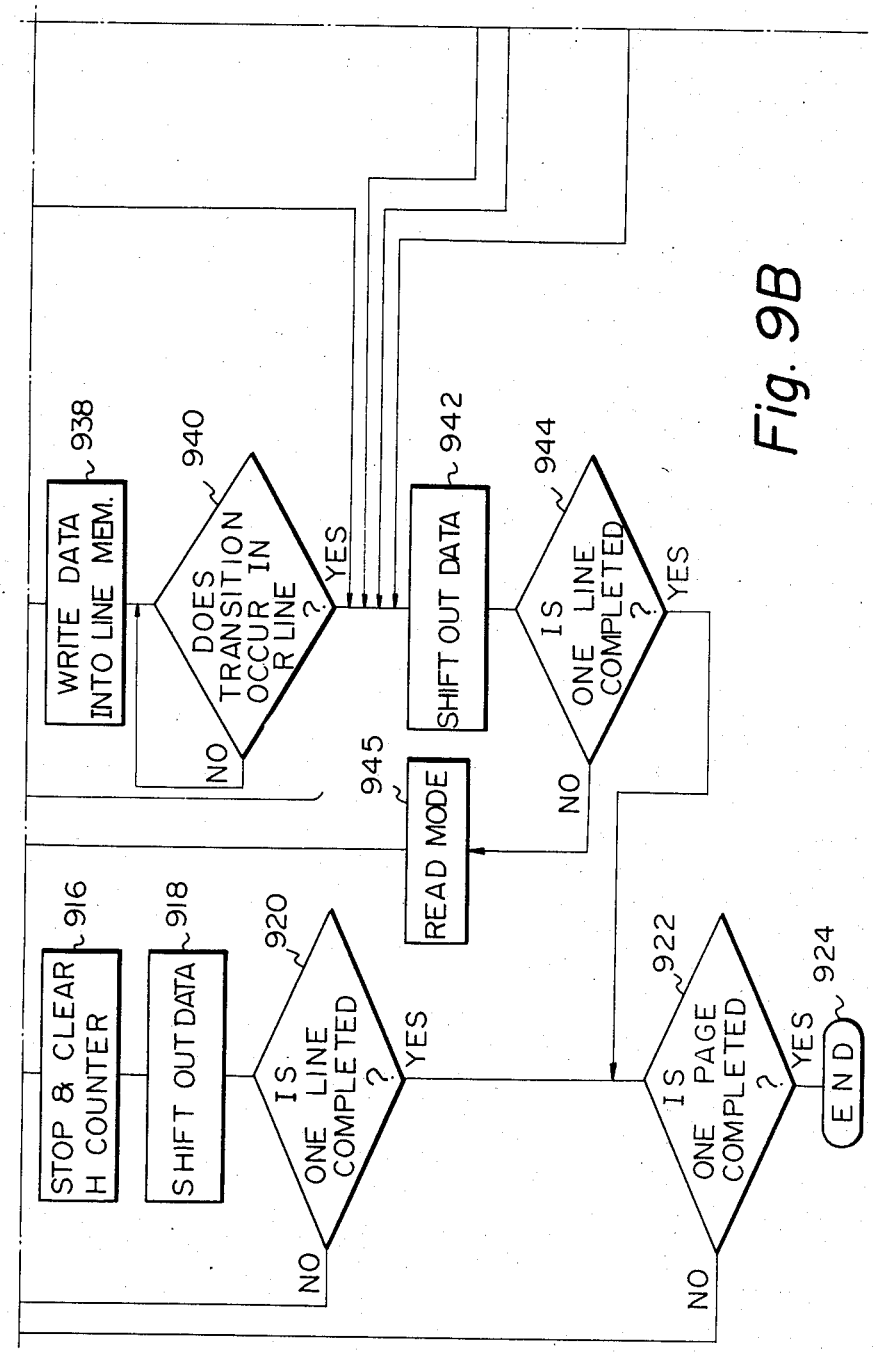

FACSIMILE SYSTEM

BACKGROUND OF THE INVENTION

1. Field of the Invention

The present invention relates to a data converting system for use in a facsimile system, more particularly, to a system for coding picture elements and decoding compressed data in the facsimile system.

2. Description of the Prior Art

In recent years, facsimile systems have been recognized as useful communication media for transmitting documents and other copy for business use. In one type of facsimile system, the transmitter side scans the picture elements of a subject copy to produce line data composed of row lengths (i.e., the number of successive black or white picture elements), "compresses", or codes, the line data, and then transmits the coded data. The receiver side receives the coded data and "restores" it, i.e., decodes it, to the original line data.

In the prior art facsimile system of this type, the coding operation has been independent of the decoding operation. Therefore, each facsimile unit has been equipped with a separate circuit for converting run lengths into code data and a separate circuit for converting code data into run lengths. This has made the prior art facsimile system large in size.

SUMMARY OF THE INVENTION

It is, therefore, an object of the present invention to provide a facsimile system which is small in size.

The inventors noted the fact that facsimile communication utilizing subscriber telephone circuits is half-duplex communication, i.e., only a coding operation can be performed during the transmission mode and only a decoding operation can be performed during the reception mode. According to the present invention, a comparator and other circuitry are added to a data compression circuit for the coding operation, so as to enable the ROM table for the coding operation to be also used for the decoding operation. As a result, both the coding and decoding operation can be performed by a single circuit.

BRIEF DESCRIPTION OF THE DRAWINGS

The present invention will be more clearly understood from the description as set forth below with reference to the accompanying drawings, wherein:

FIG. 1A and FIG. 1B form a block diagram of a general facsimile system;

FIG. 2A is a diagram illustrating the use of the P mode in a two dimensional coding technique;

FIG. 2B is a diagram illustrating examples of two successive lines in one of the vertical (V) modes of the two dimensional coding technique;

FIG. 2C is a diagram illustrating an example of two successive lines according to another of the V modes of the two dimensional coding technique;

FIG. 2D is a diagram illustrating still another example of two successive lines according to another of the V modes of the two dimensional coding technique;

FIG. 2E is a diagram of an example of two successive lines in a horizontal (H) mode of the two dimensional coding technique;

FIG. 3A and FIG. 3B form a block diagram of a transmitter side of a prior art facsimile system;

FIG. 4A and FIG. 4B form a block diagram of a receiver side of a prior art facsimile system;

FIGS. 6A, 6B and 6C form a detailed block diagram of the circuit of FIG. 5;

FIGS. 8A, 8B and 8C form a flow chart for the coding operation of the circuit of FIGS. 6A, 6B and 6C; and FIGS. 9A, 9B, 9C and 9D form a flow chart for the decoding operation of the circuit of FIGS. 6A, 6B and 6C.

DESCRIPTION OF THE PREFERRED EMBODIMENT

Figure 1B:
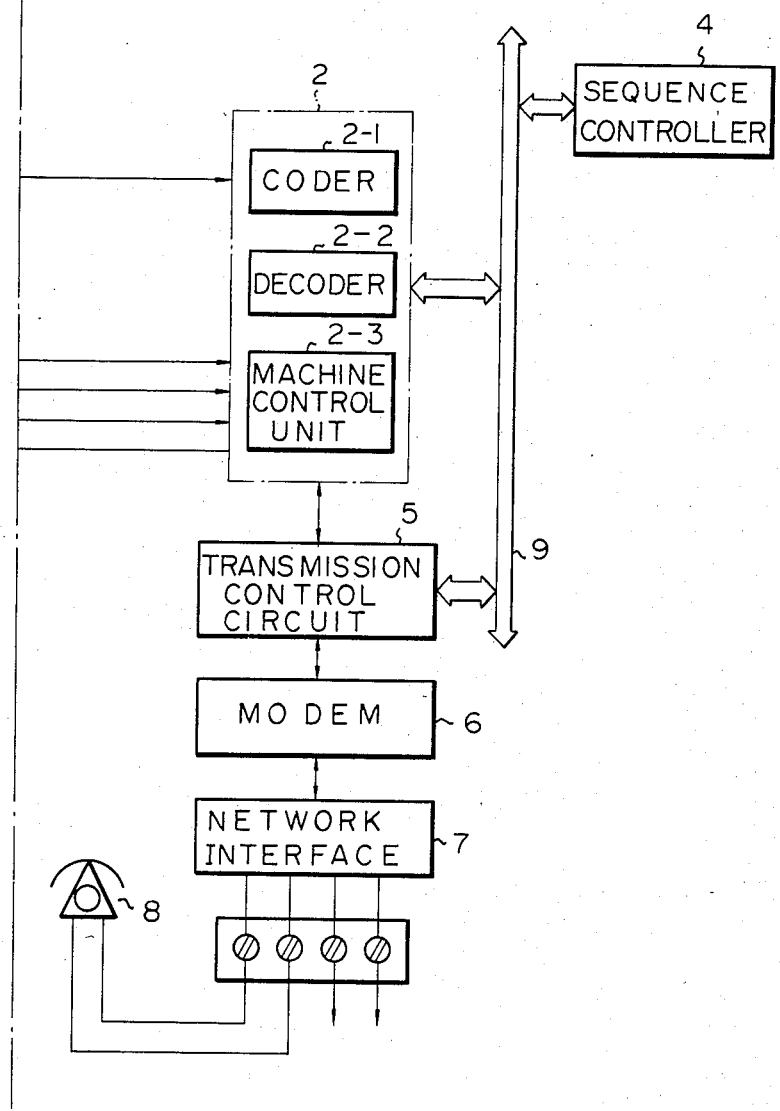

In FIG. 1, which illustrates a general facsimile system, reference numeral 1 designates a scanner which is comprised of an automatic document feeder 1-1, a fluorescent lamp 1-2, and a charge-coupled-device (CCD) image sensor 1-3 with 2048 elements. Reference numeral 2 designates a controller which is comprised of a coder 2-1 for the data compression, i.e., for the coding operation, a decoder 2-2 for the data reproduction, i.e., for the decoding operation, and a machine control unit 2-3. Reference numeral 3 designates a printer which is comprised of a thermal head driver 3-1 for driving a printed multistylus electrode 3-2. Reference numeral 4 designates a sequence controller which is constructed by a microcomputer; 5 designates a transmission control circuit; 6 designates a modulator-demodulator (MODEM) for performing a modulating operation upon a transmitting signal and performing a demodulating operation upon a received signal; 7 designates a network interface; and 8 designates a subscriber's telephone. The controller 2 and the transmission control circuit 5 are controlled by the sequence controller 4 via a data bus 9. Reference numeral 10 indicates an operation panel.

There are two basic run-length coding techniques: one-dimensional and two-dimensional. In the two-dimensional coding technique, note that one scan line in every K lines (hereinafter referred to as a "K-line") is coded by a run-length code to prevent error propagation. Therefore, if K is 2 or 4, the first line in every 2 or 4 lines of the two-dimensional code is exceptionally coded by the one-dimensional coding technique.

For the one-dimensional coding technique, a modified Huffmann (MH) code may be used. For the two-dimensional coding technique, a modified read (MR) code defined by CCITT Recommendation T4 may be used. The two-dimensional code has various modes such as a pass mode (P mode), a vertical mode (V mode), and a horizontal mode (H mode), which will be explained with reference to FIGS. 2A through 2E. In these figures, references R and D designate two successive lines, i.e., a reference line (a previous line) and a data line (a current line), respectively, and $T_1, T_2, \ldots$ designate white-to-black or black-to-white transitions.

In FIG. 2A, which illustrates examples of the P mode, two successive transitions $T_1$ and $T_2$ or $T_3$ and $T_4$ occur in the reference line R, while no transitions occur in the data line D.

In FIG. 2B, which illustrates examples of one of the V modes, i.e., a $V_0$ mode, a transition $T_5$ or $T_6$ occurs concurrently in the reference line R and the data line D.

In FIG. 2C, which illustrates examples of another V mode, i.e., a $V_R$ mode, a first transition $T_7$ or $T_9$ occurs in the reference line R, and a second transition $T_8$ or $T_{10}$ occurs in the data line D. In this case, the relative distance (the number of white or black picture elements) $d_1$ or $d_2$ is not more than a predetermine value such as 3.

In FIG. 2D, which illustrates examples of still another V mode, i.e., $V_L$ mode, a first transition $T_{11}$ or $T_{13}$ occurs in the data line D, and a second transition $T_{12}$ or $T_{14}$ occurs in the reference line R. In this case, the relative distance $d_3$ or $d_4$ is also not more than 3.

In FIG. 2E, which illustrates examples of the H mode, two successive transitions $T_{14}$ and $T_{15}$ or $T_{16}$ and $T_{17}$ occur in the data line D, while no transitions occur in the reference line R. Otherwise, a first transition $T_{18}$ or $T_{20}$ occurs in one of the lines R and D, while a second transition $T_{19}$ or $T_{21}$ occurs in the other line. However, in this case, the relative distance $d_5$ or $d_6$ is 4 or more.

The prior art facsimile system will now be explained with reference to FIG. 3.

In FIG. 3, which illustrates a transmitter side, i.e., a coder, of a prior art facsimile system, reference numeral 11 designates a microprocessor unit (MPU); 12 designates a ROM for storing programs, constants, and the like; and 13 designates a random access memory (RAM) for temporarily storing data. The MPU 11, the ROM 12, and the RAM 13 constitute the sequence controller 4. Reference numerals 14 and 14' designate multiplexers; 15-1 through 15-3 designate line address counters; 16-1 through 16-3 designate line memories, accessed by the line address counters 15-1 through 15-3, for storing picture elements, i.e., video signals VID; 17 and 17' designate multiplexers; 18R and 18D designate transition detecting circuits for detecting a transition in the reference line R and the data line D, respectively; 19H and 19V designate horizontal and vertical counters, respectively, for counting a corresponding run-length indicated by the transition detecting circuits 18R and 18D, respectively; 20 designates a multiplexer; 21 designates a ROM table for coding a run length into compressed data; 22 designates a shift register; and 23 designates a code buffer memory for storing compressed data. The ROM table 21 also stores mode codes for indicating each mode such as the P mode, the $V_0$ mode, the $V_R$(d) mode where the relative distance d is 1, 2, or 3, the $V_L$(d) mode where the relative distance d is 1, 2, or 3, and the H mode.

The operation of the circuit of FIG. 3 will be later explained in detail, since all the constituents of the circuit of FIG. 3 are used in the circuit of FIG. 6 according to the present invention.

Figure 4B:
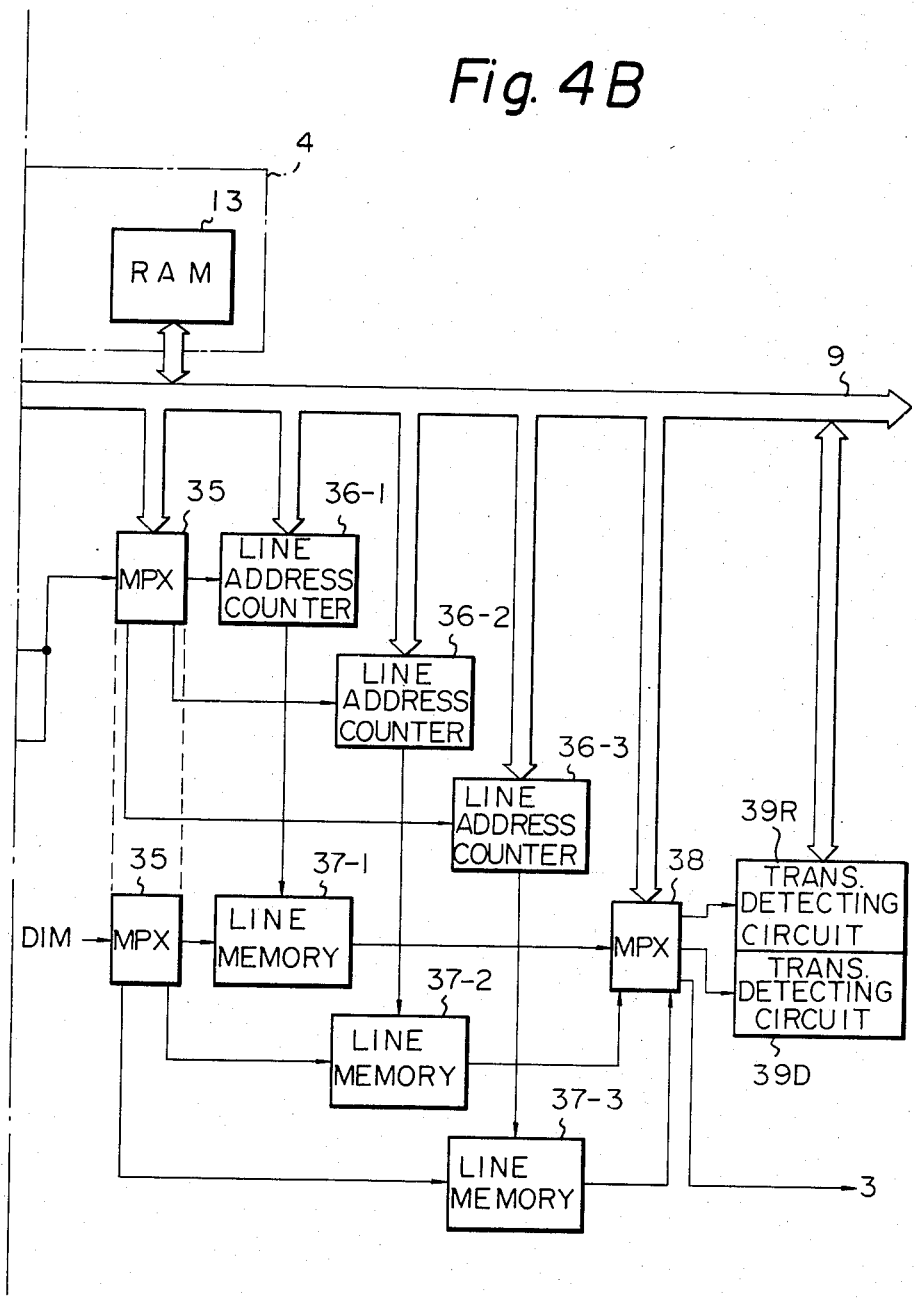

In FIG. 4, which illustrates a receiver side, i.e., a decoder of a prior art facsimile system, reference numeral 31 designates a code buffer memory for storing received compressed data; 32 designates a shift register; 33 designates a ROM table for decoding compressed data so as to generate a corresponding run length; 34H and 34V designate horizontal and vertical counters, respectively, for storing the run-length; 35 and 35' designate multiplexers; 36-1 through 36-3 designate line address counters; 37-1 through 37-3 designate line memories, accessed by the line address counters 36-1 through 36-3, for storing video signals VID; 38 designates a multiplexer; and 39R and 39D designate transition detecting circuits for detecting a transition in the reference line R and the data line D, respectively.

The operation of the circuit of FIG. 4 will now be briefly explained.

MH Code Decoding

Code data or compressed data is shifted from the code buffer memory 31 to the shift register 32, which continues to shift bits "0" until bit "1" appears. Such bits "0" are transmitted to the MPU 11, which determines whether or not the mode code is an MH code in accordance with the number of the bits "0". If so, the effective data is transmitted as an address to the ROM table 33 which, in turn, generates a corresponding run length to the horizontal counter 34H. Note that, in this case, the horizontal counter 34H is a down counter. The MPU 11 then reduces the value of the horizontal counter 34H which, in turn, generates pulses through the multiplexer 35 to one of the line address counters, such as 36-1. As a result, white or black picture elements corresponding to the above-mentioned run length are written onto the line memory 37-1. In this case, the white or black video signals VID are indicated by the MPU 11.

MR Code Decoding

Since the K-line of the MR code is one-dimensional, the K-line is decoded in the same manner as the above-mentioned MH code.

After code data is shifted from the code buffer memory 31 to the shift register 32, the MPU 11 determines if the mode of the code data is P, $V_0$, $V_R$, $V_L$, or H. The decoding for each mode will be explained. Note that for purposes of explanation, hereinafter, a reference line R is defined by the line memory 37-1, and a data line D is defined by line memory 37-2.

In the case of a P mode, the line address counters 36-1 and 36-2 are counted up in parallel until the transition detecting circuit 39R detects a transition in the output of the line memory 37-1 for the reference line R. Simultaneously, white or black signals are written into the line memory 37-2. This process is repeated twice to complete the P mode decoding.

In the case of a $V_0$ mode, the line address counters 36-1 and 36-2 are also counted up in parallel until the transition detecting circuit 39R detects a transition in the output of the line memory 37-1 for the reference line R. Simultaneously, white or black signals are written into the line memory 37-2. The above-mentioned process is performed only once to complete the $V_0$ mode decoding.

In a $V_R$ or $V_L$ mode, effective data as well as a mode code is also converted by the ROM table 33 into a corresponding run length which is then set in the vertical counter 34V. In this state, the line address counters 36-1 and 36-2 are counted up in parallel until the transition detecting circuit 39R detects a transition in the output of the line memory 37-1 for the reference line R. Simultaneously, white or black signals are written into the line memory 37-2. The MPU 11 then reduces the value of the vertical counter 34V which, in turn, generates pulses to the line address counter 36-2. As a result, in the $V_R$ mode, the line address counter 36-2 is counted up by receiving the pulses of the vertical counter 34V and, simultaneously, the same video signals to those at the previous step are written into the line memory 37-2. In the $V_L$ mode, the line address counter 36-2 is counted down by receiving the pulses of the vertical counter 34V and, simultaneously, the opposite video signals to those at the previous step are written into the line memory 36-2.

In the case of an H mode, two kinds of effective data as well as a mode code are processed. That is, first effective data is converted by the ROM table 33 into a corresponding run length, which is then set in the horizontal counter 34H. Then, the MPU 11 reduces the value of the horizontal counter 34H which, in turn generates, pulses to the line counter 36-2 for the data line D. Simultaneously, in this case, white or black signals are written into the line memory 37-2. Next, second effective data is converted by the ROM table 33 into a corresponding run length, which is then set in the horizontal counter 34H. Then, the MPU 11 again reduces the value of the horizontal counter 34H which, in turn, generates pulses to the line counter 36-2 for the data line D. Simultaneously, in this case, the opposite signals are written into the line memory 37-2. Thus, the H mode decoding is completed.

As is apparent from FIGS. 3 and 4, there are common elements between the circuit of FIG. 3 and the circuit of FIG. 4. However, the ROM table 21 of FIG. 3 differs from the ROM table 33 of FIG. 4. Therefore, it is difficult to combine the circuits of FIGS. 3 and 4.

According to the present invention, the ROM table 21 for the coding operation is also used for the decoding operation, which enables the coder and the decoder to be embodied by a single circuit.

Figure 5:
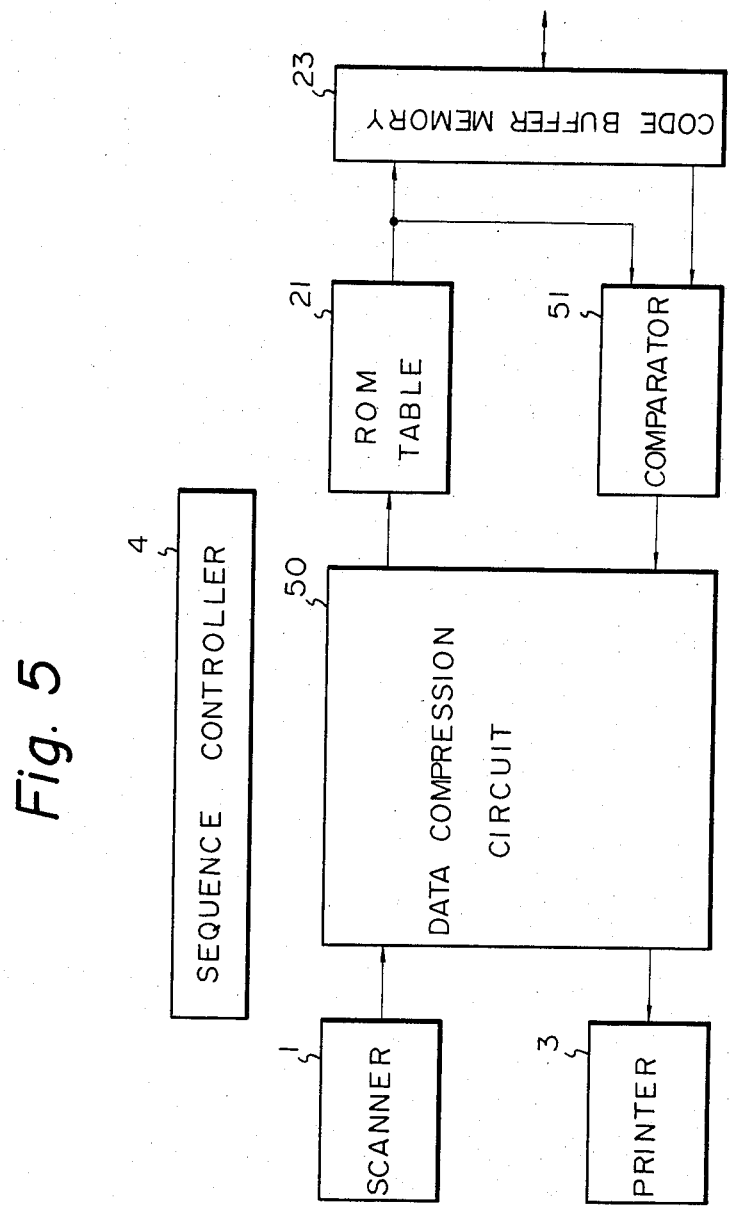
FIG. 5 is a basic block diagram of an embodiment of the facsimile system according to the present invention.
Figure 6B:
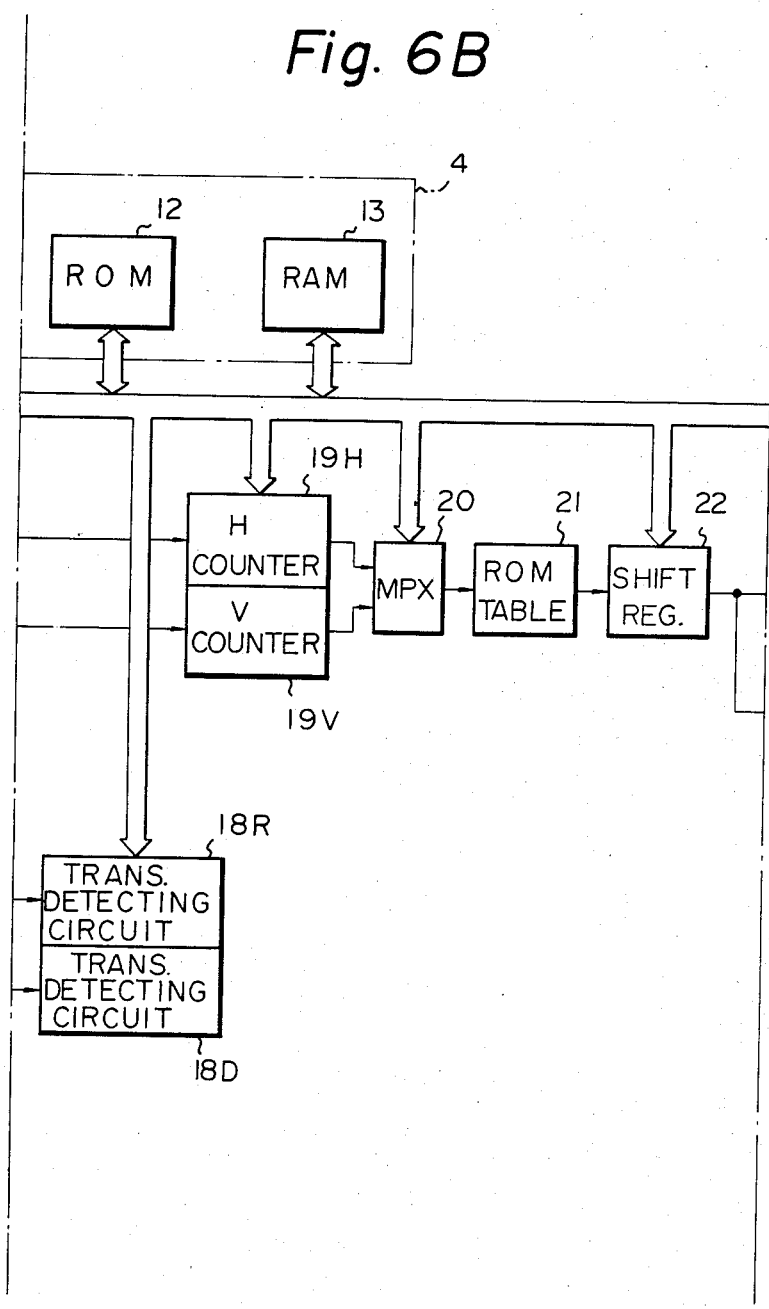
Figure 6C:
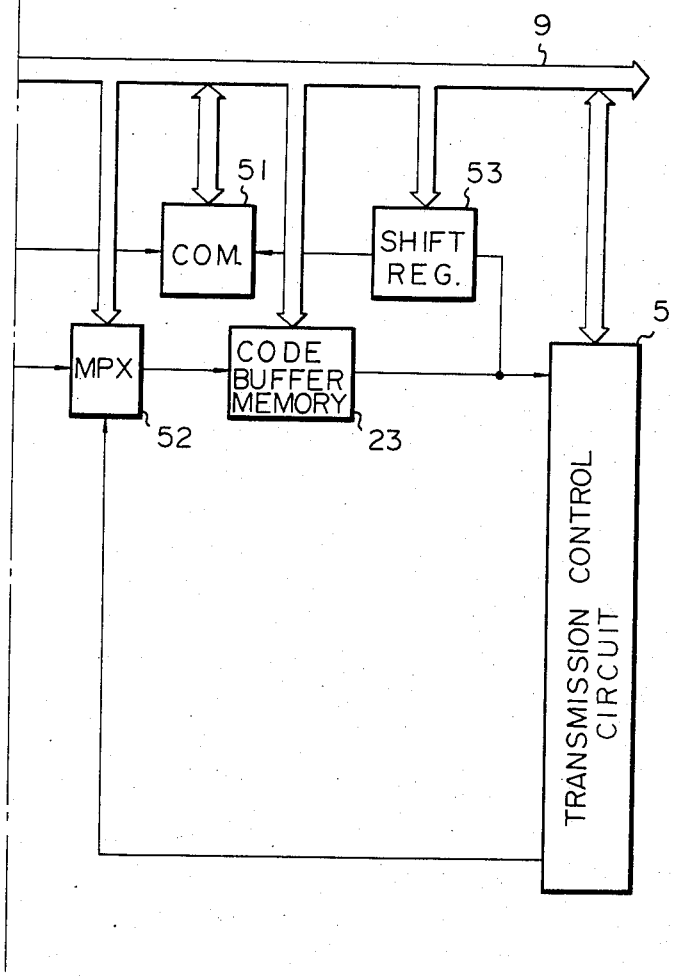

One embodiment of the present invention is illustrated in FIG. 5, which is a basic block diagram, and FIG. 6, which is a detailed block diagram.

In FIGS. 5 and 6, the elements which are the same as in previous figures are indicated by the same reference numerals. In FIG. 5, reference numeral 50 is a data compression circuit including the elements 14, 14', . . . , 19H, 19V, and 20 of FIG. 3. Reference numeral 51 is a comparator. In the decoding operation, code data from the code buffer memory 23 is compared with code data obtained by scanning the ROM table 21. This scanning operation is performed by the sequence controller 4 which controls the counters of the data compression circuit 50 or directly controls the ROM table 21. As a result, when a match occurs in the comparator 51, a run length obtained in the data compression circuit 50 is transmitted to the printer 3 so as to reproduce the picture elements in the line memories.

As shown in more detail in FIG. 6, a multiplexer 52 and a shift register 53 are also added to the circuit of FIG. 3.

Figure 7:
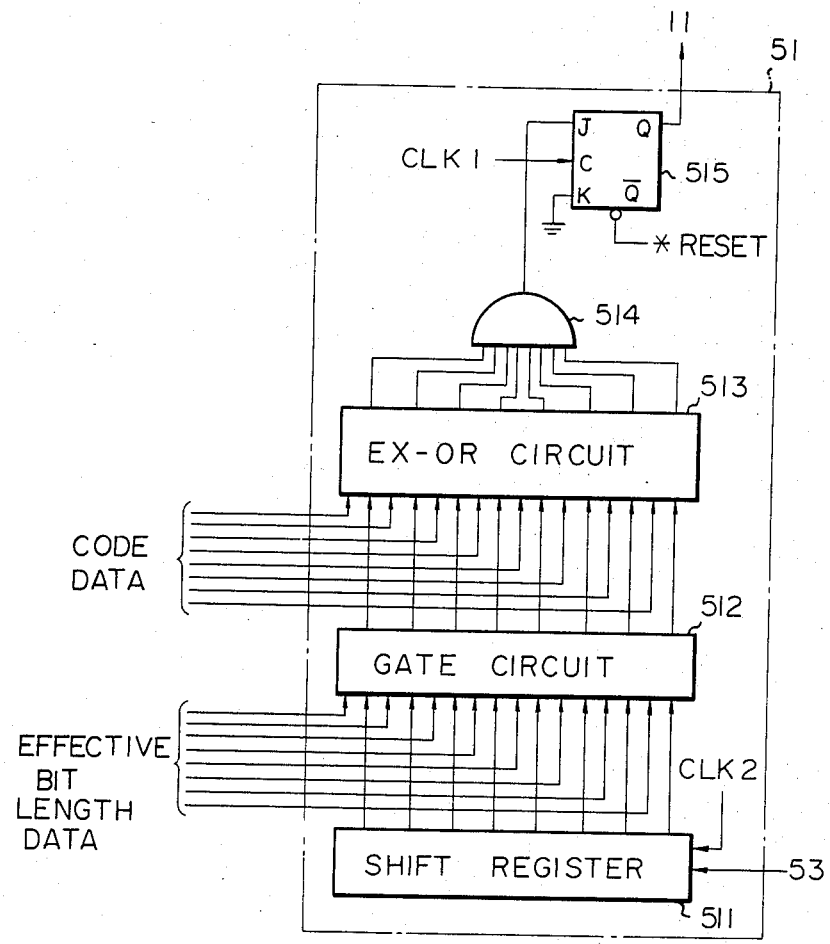
FIG. 7 is a block diagram of the comparator of FIG. 6.

In FIG. 7, which is a detailed block diagram of the comparator 51, reference numeral 511 designates a shift register for performing a serial/parallel transforming operation upon data out of the shift register 53; 512 designates a gate circuit for masking the outputs of the shift register 511 with the effective bit length data transmitted from the ROM table 21 through the shift register 22; 513 designates an exclusive-OR circuit which performs a comparison operation upon code data transmitted from the ROM table 21 and the outputs of the gate circuit 512; 514 designates an AND circuit; and 515 designates a flip-flop for storing the output of the AND circuit 515 for a predetermined time defined by clock signals CLK1 and *RESET transmitted from the sequence controller 4. That is, when a match occurs between the code data transmitted from the ROM table 21 through the shift register 22 and the code data transmitted from the shift register 53, the flip-flop 515 transmits an output to the MPU 11 of the sequence controller 4.

Figure 8B:
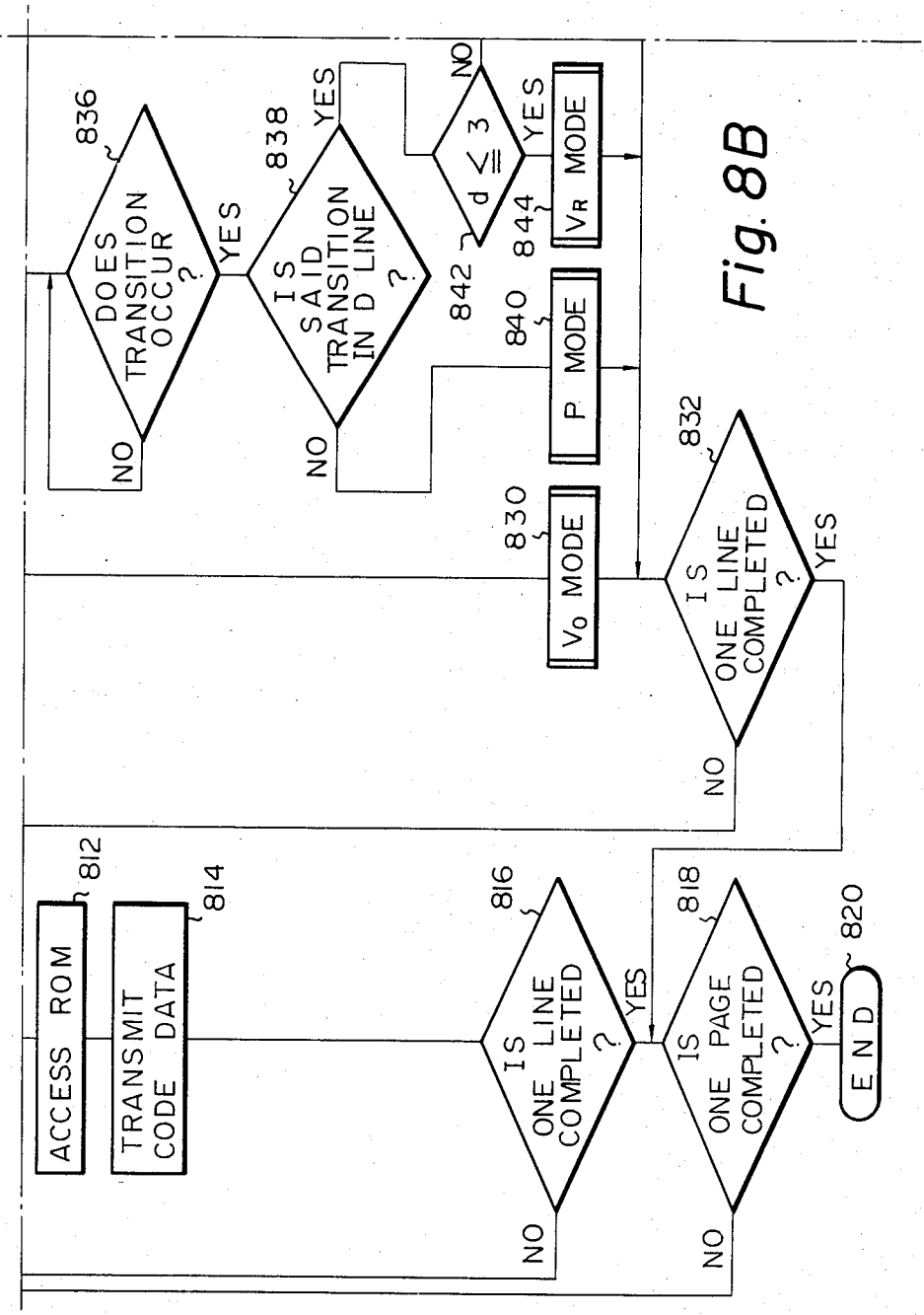

The coding operation of the circuit of FIG. 6 will now be explained with reference to the flow chart of FIG. 8. It should be noted that this coding operation is exactly the same as that of the circuit of FIG. 3.

The control flow starts at step 800 and proceeds to initialization step 802 in which the MPU 11 controls the multiplexer 52, so as to connect the shift register 22 to the code buffer memory 23. In this state, video signals VID are read in one of the line memories 16-1, 16-2, and 16-3. In this case, the multiplexers 14 and 14' are sequentially controlled by the MPU 11.

At step 804, the MPU 11 determines whether or not a data line to be compressed is a first line. If the answer at step 804 is affirmative, the flow proceeds to step 808, while if the answer at step 804 is negative, the flow proceeds to step 806, in which the MPU 11 determines whether or not a data line to be compressed is a K-line of an MR code. If the answer at step 806 is affirmative, the flow proceeds to step 808, while if the answer at step 806 is negative, the flow proceeds to step 822.

At steps 808 through 816, the MPU 11 performs an MH code compression, i.e., a one-dimensional compression upon a data line stored in a line memory, for example, 16-1. At step 808, the MPU 11 controls the multiplexers 17 and 17' so as to select the line address counter 15-1 and the line memory 16-1. As a result, data is read from the line memory 16-1. Simultaneously, the MPU 11 operates the transition detecting circuit 18R and starts the horizontal counter 19H.

At step 810, the MPU 11 determines whether or not the transition detecting circuit 18R detects a white-to-black or black-to-white transition in the data read out of the line memory 16-1. If the answer at step 810 is affirmative, the flow proceeds to step 812. If the answer at step 810 is negative the flow returns to step 810 itself.

At step 812, the MPU 11 stops the horizontal counter 19H and controls the multiplexer 20 to access the ROM table 21. That is, the value of the horizontal counter 19H is transmitted as an address to the ROM table 21 which, in turn, transmits a corresponding code data, i.e., compressed data to the shift register 22. After that, the counter 19H is cleared. Next, at step 814, the MPU 11 controls the multiplexer 52 so that the value of the shift register 22 is shifted via the multiplexer 52 to the code buffer memory 23.

At step 816, the MPU 11 determines whether or not the coding operation for one line is completed. If the answer at step 816 is negative, the flow returns to step 808, and, therefore, the above-mentioned process is repeated. If the answer at step 816 is affirmative, the flow proceeds to step 818.

At step 818, the MPU 11 determines whether or not the coding operation for one page is completed. If the answer at step 818 is negative, the flow returns to step 806. If the answer at step 818 is affirmative, the flow proceeds to step 820 so as to complete the flow.

At steps 822 through 854, the MPU 11 performs an MR code compression, i.e., two-dimensional compression upon a data line stored in the line memory, for example 16-2. In this case, assume that a reference line is stored in the line memory 16-1.

At step 822, the MPU 11 controls the multiplexers 17 and 17' so as to select the line address counters 15-1 and 15-2 and the line memories 16-1 and 16-2. As a result, data is read from both of the line memories 16-1 and 16-2. Simultaneously, the MPU 11 operates the transition detecting circuits 18R and 18D and starts the horizontal counter 19H.

At step 824, the MPU 11 determines whether or not at least one of the transition detecting circuits 18R and 18D detects a white-to-black or black-to-white transition in the read data out of the line memories 16-1 and 16-2. If the answer at step 824 is affirmative, the flow proceeds to step 826, so as to stop the horizontal counter 19H. If the answer at step 824 is negative, the flows return to step 824 itself.

At step 826, the MPU 11 determines whether or not the transition at step 824 is in the reference line, and at step 828, the MPU 11 determines whether the transition at step 824 is in the data line. If the transition at step 824 is in both the reference line and the data line, the flow proceeds to step 830. If the transition at step 824 is only in the reference line, the flow proceeds to step 834. If the transition at step 824 is only in the data line, the flow proceeds to step 856.

At step 830, the MPU 11 performs a $V_0$ mode compression upon read data in the data line of the line memory 16-2. In this case, the MPU 11 controls the multiplexer 20 to access the ROM table 21. That is, the MPU 11 transmits an address code indicating the $V_0$ mode via the multiplexer 20 to the ROM table 21 which, in turn, transmits a corresponding code data to the shift register 22. After that, the MPU 11 clears the horizontal counter 19H and controls the multiplexer 52 so that the value of the shift register 22 is shifted via the multiplexer 52 to the code buffer memory 23. Then, the flow proceeds to step 832.

At step 832, the MPU 11 determines whether or not the coding operation for one line is completed. If the answer at step 832 is negative, the flow returns to step 822, and, therefore, the above-mentioned process is repeated. If the answer at step 832 is affirmative, the flow proceeds to step 818.

At step 834, the MPU 11 again controls the multiplexers 17 and 17' so as to select the line address counters 15-1 and 15-2 and the line memories 16-1 and 16-2 so as to read data from both of the line memories 16-1 and 16-2. Simultaneously, the MPU 11 operates the transition detecting circuits 18R and 18D and restarts the horizontal counter 19H. Further, the MPU 11 starts also the vertical counter 19V.

At step 836, the MPU 11 determines whether or not at least one of the transition detecting circuits 18R and 18D detects a white-to-black or black-to-white transition in the read data out of the line memories 16-1 and 16-2. If the answer at step 836 is affirmative, the flow proceeds to step 838, so as to stop the horizontal counter 19H and the vertical counter 19V. If the answer at step 836 is negative, the flow returns to step 836 itself.

At step 838, the MPU 11 determines whether or not the transition at step 836 is in the data line. If the answer at step 836 is negative, the flow proceeds to step 840. If the answer at step 836 is affirmative, the flow proceeds to step 842.

At step 840, the MPU 11 performs a P mode compression upon read data in the data line of the line memory 16-2. In this case, the MPU 11 controls the multiplexer 20 to access the ROM table 21. That is, the MPU 11 transmits an address code indicating the P mode via the multiplexer 20 to the ROM table 21 which, in turn, transmits a corresponding code data to the shift register 22. After that, the MPU 11 clears the horizontal counter 19H and the vertical counter 19V and controls the multiplexer 52 so that the value of the shift register 22 is shifted via the multiplexer 52 to the code buffer memory 23. Then, the flow proceeds to step 832.

At step 842, the MPU 11 determines whether or not the value d of the vertical counter 19V is not more than 3. If the answer is affirmative, the flow proceeds to step 844 for $V_R$ mode compression. If the answer is negative, the flow proceeds to step 846 for H mode compression.

At step 844, the MPU 11 performs $V_R$ mode compression upon read data in the data line of the line memory 16-2. In this case, the MPU 11 controls the multiplexer 20 to access the ROM table 21. That is, the MPU 11 transmits an address code, indicating the $V_R$ mode, via the multiplexer 20 to the ROM table 21 which, in turn, transmits a corresponding code data to the shift register 22. Note that there are three kinds of $V_R$ codes, corresponding to the cases wherein the relative distance d is 1, 2, or 3. After that, the MPU 11 clears the horizontal counter 19R and the vertical counter 19V and controls the multiplexer 52 so that the value of the shift register 22 is shifted via the multiplexer 52 to the code buffer memory 23. Then, the flow proceeds to step 832.

At steps 846 through 854, the MPU 11 performs H mode compression upon read data in the data line of the line memory 16-2, which will now be explained in more detail.

At step 846, the MPU 11 controls the multiplexer 20 to access the ROM table 21. That is, the MPU 11 transmits an address code indicating the H mode to the ROM table 21 which, in turn, transmits a corresponding code data to the shift register 22. After that, the MPU 11 clears only the vertical counter 19V. In addition, the MPU 11 controls the multiplexer 52 so that the value of the shift register 22 is shifted via the multiplexer 52 to the code buffer memory 23.

At step 848, the MPU 11 codes a first run-length value of the horizontal counter 19H into code data. That is, the MPU 11 controls the multiplexer 20 to access the ROM table 21. In this case, the value of the horizontal counter 19H is transmitted as an address code to the ROM table 21 which, in turn, transmits a corresponding code data to the shift register 22. After that, the MPU 11 clears the horizontal counter 19H and controls the multiplexer 52 so that the value of the shift register 22 is shifted via the multiplexer 52 to the code buffer memory 23.

Next at step 850, the MPU 11 again controls the multiplexers 17 and 17' so as to select the line address counters 15-1 and 15-2 and the line memories 16-1 and 16-2. As a result, data is read from both of the line memories 16-1 and 16-2. Simultaneously, the MPU 11 operates only the transition detecting circuit 18D for the data line and starts the horizontal counter 19H.

At step 852, the MPU 11 determines whether or not the transition detecting circuit 18D detects a transition in the data read out of the line memory 16-2. If the answer at step 852 is affirmative, the flow proceeds to step 852, so as to stop the horizontal counter 19H. If the answer at step 852 is negative, the flow returns to step 852 itself.

Next, at step 854, the MPU 11 again codes a second run-length value of the horizontal counter 19H into code data in the same way as at step 848.

The operations at steps 856, 858, 860, 862, and 864 substantially correspond to the operations at steps 834, 836, 838, 842, and 844, respectively. In addition, the operations at steps 866, 868, 870, 872, and 874 substantially correspond to the operations at steps 846, 848, 850, 852, and 854, respectively. However, note that the case wherein the answer at step 860 is negative corresponds to the upper two examples of FIG. 2E.

Figure 9C:
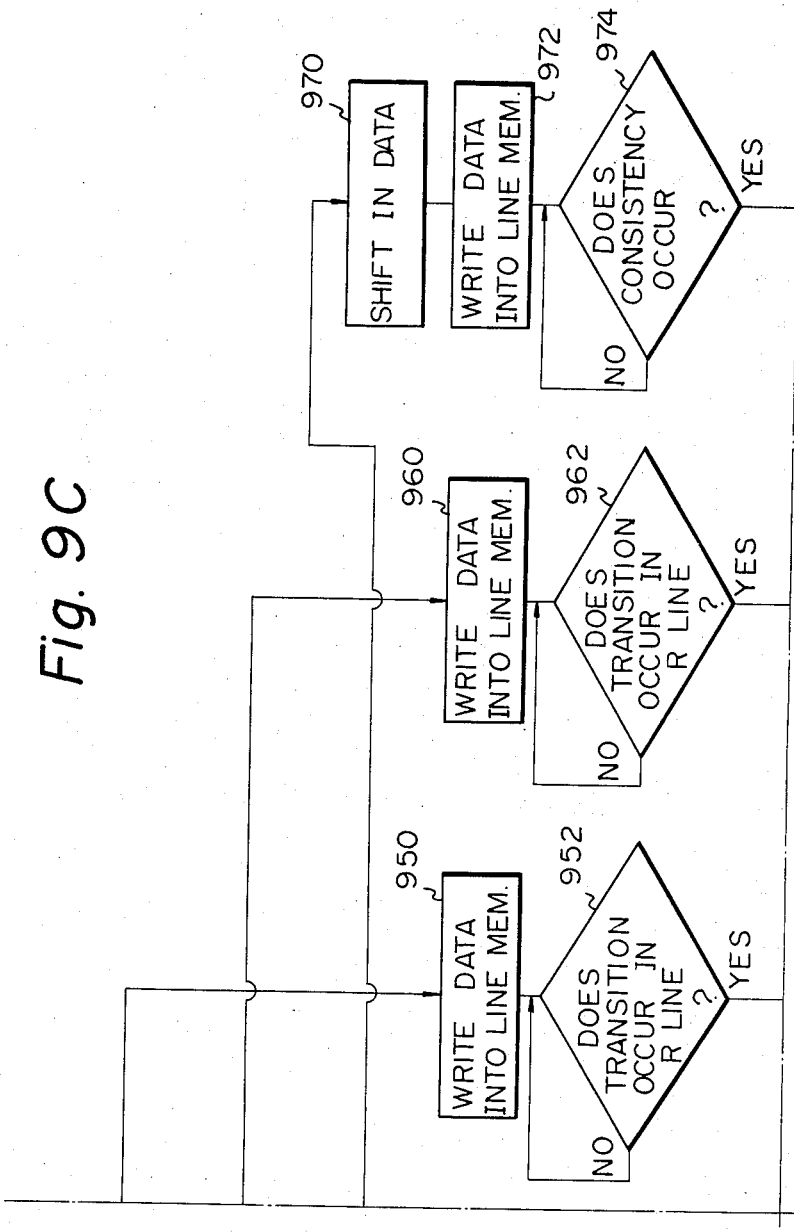
Figure 9D:
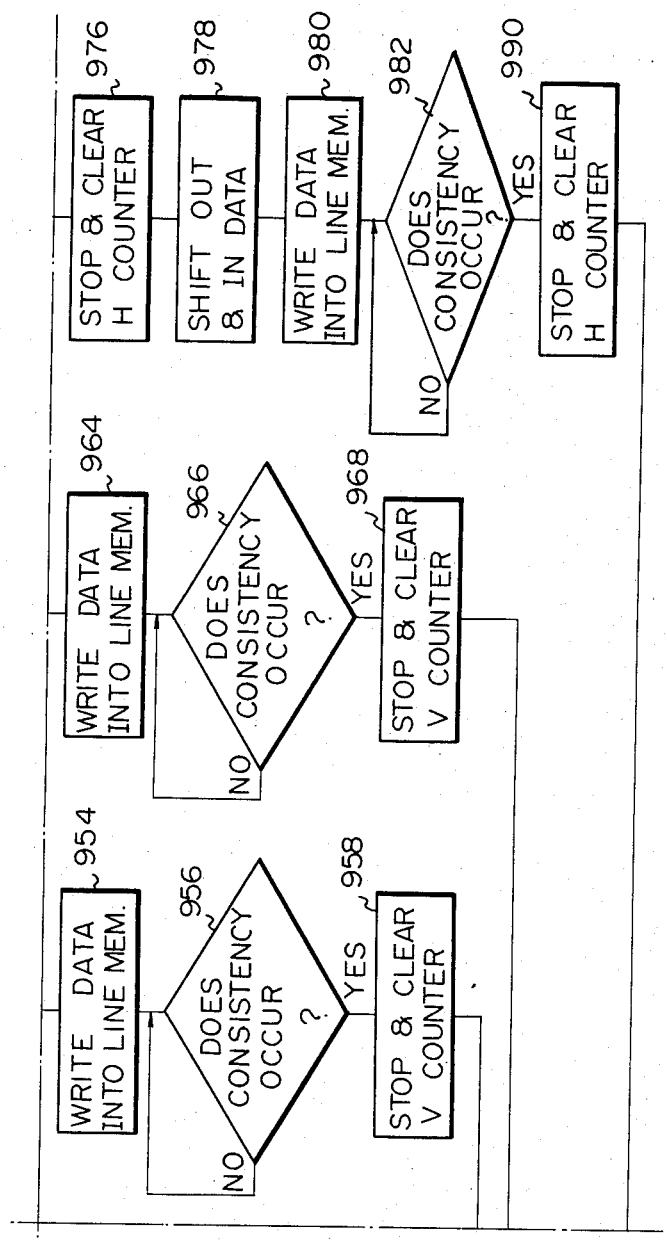

The decoding operation of the circuit of FIG. 6 will now be explained with reference to FIG. 9.

The control flow starts at step 900 and proceeds to initialization step 902 in which the MPU 11 controls the multiplexer 52, so that the output terminal of the transmission control circuit 5 is connected via the multiplexer 52 to the code buffer memory 23. In addition, in this state, assume that first code data or compressed data is shifted to the shift register 53.

At step 904, the MPU 11 reads a mode code out of the shift register 53. In this case, a synchronization code is also detected. The operation of reading a mode code by the MPU 11 is performed as follows. The MPU 11 controls the shift register 53 to shift bits "0" following the synchronization code until bit "1" appears. The number of bits "0" and the bits after the bits "0" are detected by the MPU 11 to determine the mode.

In the case of an MH mode code or a K-line of an MR mode code, the determination at steps 906 or 908 leads to step 910.

At step 910, the MPU 11 shifts the data of the shift register 53 to the shift register 511 (FIG. 7) of the comparator 51.

At step 912, the MPU 11 controls the multiplexers 14 and 14' to select one line address counter such as 15-1 and one line memory such as 16-1. In addition, the MPU 11 indicates the white or black video signal VID. Further, the MPU 11 controls the multiplexer 20 so that the horizontal counter 19H is connected to the ROM table 21. Then, the MPU 11 starts the line address counter 15-1 to write the video signals VID into the line memory 16-1 and, simultaneously, starts the horizontal counter 19H.

At step 914, the value of the horizontal counter 19H is transmitted via the multiplexer 20 as an address to the ROM table 21 which, in turn, transmits effective bit length data and code data to the comparator 51. The MPU 11 waits for the generation of a match or consistency between the code data of the ROM table 21 and the shift register 511. If consistency occurs, the flow proceeds to step 916.

At step 916, the MPU 11 stops and clears the horizontal counter 19H. Thus, the conversion of one code data into a corresponding run length is completed.

At step 918, the MPU 11 shifts the reproduced data out of the shift register 53 and shifts next data into the shift register 53.

At step 920, the MPU 11 determines whether or not decoding for one line is completed. If the answer at step 920 is affirmative, the flow proceeds to step 922. If the answer at step 920 is negative, the flow returns to step 910, so that the above-mentioned process is repeated.

At step 922, the MPU 11 determines whether or not decoding for one page is completed. If the answer at step 922 is affirmative, the flow proceeds to step 924, thereby completing the flow. If the answer at step 922 is negative, the flow returns to step 904.

In the case of a P mode code, the determinations at steps 906, 908, 926, 928, 930, and 932 lead to step 934.

At step 934, the MPU 11 controls the multiplexers 14 and 14' so as to select the line address counters 15-1 and 15-2 and the line memories 16-1 and 16-2. In this case, the line memory 16-1 is used for a reference line, and the line memory 16-2 is used for a data line. In addition, the MPU 11 indicates the white or black video signal VID. Further, the MPU 11 controls the multiplexer 17', so that the transition detecting circuit 18R is connected to the line memory 16-1. Then, the MPU performs a read operation upon the line memory 16-1 and, simultaneously, performs a write operation upon the line memory 16-2.

At step 936, the MPU 11 determines whether or not the transition detecting circuit 18R detects a transition. If the circuit 18R detects a transition in the reference line of the line memory 16-1, the flow proceeds to step 938.

The operations at steps 938 and 940 are the same as those at steps 934 and 936, respectively.

Thus, in P mode code decoding, the identical video signals VID are written into the line memory 16-2 until two transitions appear in the reference line. The flow then proceeds to step 942, thereby completing the P mode decoding.

At step 942, the MPU 11 shifts the reproduced data out of the shift register 53 and shifts next data into the shift register 53.

At step 944, the MPU 11 determines whether or not decoding for one line is completed. If the answer at step 944 is affirmative, the flow proceeds to step 922. If the answer at step 942 is negative, the flow proceeds to step 945 in which a mode code of the next data is read, and, after that, the flow returns to step 926.

In the case of a $V_0$ mode code, the determinations at steps 906, 908, and 926 lead to step 946. The operations at steps 946 and 948 are the same as those at steps 934 and 936, respectively. That is, the identical video signals VID are written into the line memory 16-2 until only one transition occurs in the reference line.

In the case of a $V_R$ mode code, the determinations at steps 906, 908, 926, and 928 lead to step 950.

The operations at steps 950 and 952 are also the same as those at steps 934 and 936, respectively. That is, the identical video signals VID are written into the line memory 16-2 until only one transition occurs in the reference line.

Next, at step 954, the MPU 11 controls the multiplexer 20 so that the vertical counter 19V is connected to the ROM table 21. Then, the MPU 11 starts or counts up the line address counter 15-2 to write the video signals VID into the line memory 16-2 and, simultaneously, starts the vertical counter 19V.

At step 956, the value of the vertical counter 19V is transmitted via the multiplexer 20 as an address to the ROM table 21 which, in turn, transmits effective bit length data and code data to the comparator 51. The MPU 11 waits for the generation of consistency between the code data of the ROM table 21 and the shift register 511. If consistency occurs, the flow proceeds to step 958.

At step 958, the MPU 11 stops and clears the vertical counter 19V. Then, the flow proceeds to step 942, thereby completing the $V_R$ mode's decoding.

In the case of a $V_L$ mode code, the determinations at steps 906, 908, 926, 928, and 930 lead to step 960.

The operations at steps 960, 962, 964, 966, and 968 are the same as the operations at steps 950, 952, 954, 956, and 958, respectively, except for the following. That is, at step 964, the MPU 11 indicates the opposite video signal. In addition, the MPU 11 reduces the line address counter 15-2 to write the opposite video signals into the line memory 16-2.

In the case of an H mode, the determinations at steps 904, 906, 926, 928, 930, and 932 lead to step 970.

The operations at steps 970, 972, 974, and 976 are the same as the operations at steps 910, 912, 914, and 916 for a one-dimensional code, respectively. In addition, the operations at steps 978, 980, 982, and 990 are substantially the same as the operation at steps 910, 912, 914, and 916, respectively. However, the video signals written into the line memory 16-2 at step 972 are opposite to the video signals written into the line memory 16-2 at step 980. Thus, two kinds of run lengths are written into the line memory 16-2.

The above-mentioned reproduced data in the line memories are sequentially transmitted via the multiplexer 17' to the printer 3.

As explained above, according to the present invention, since a ROM table for the coding operation is also used for the decoding operation, the coder and decoder can be constructed in a single circuit, thereby reducing the size of the facsimile system.

We claim:

1. A facsimile system in which data compression is performed upon line data as a result of scanning picture elements in a transmitter side and in which compressed data is reproduced in a receiver side, comprising:
   a data compression circuit for generating a run length as a result of the scanning of the picture elements, said data compression circuit comprising:
     at least one line memory for storing the line data;
     transition detecting means, operatively connected to said line memory, for detecting the white-to-black or black-to-white transitions in the line data stored in said at least one line memory; and
     run-length counting means, operatively connected to said transition detecting means, for counting a run length between adjacent transitions in dependence upon the output signals of said transition detecting means;
   a ROM table, operatively connected to said data compression circuit, for coding the run length generated by said data compression circuit into compressed data;
   a code buffer memory, operatively connected to said ROM table, for storing the compressed data;
   comparing means, operatively connected to said ROM table and said code buffer memory, for comparing the compressed data output by said code buffer memory; and
   sequence control means, operatively connected to said data compression circuit, for controlling said run-length counting means by supplying a sequential data signal thereto so as to generate a sequence of run-lengths, the reproduced data being simultaneously obtained by supplying the sequential data signal to said at least one line memory until said comparing means detects a match as a result of comparing two kinds of said compressed data.

2. A system as set forth in claim 1, wherein the compressed data stored by said ROM table includes effective bit length data and wherein said comparing means comprises:
   a shift register, operatively connected to said code buffer memory, for performing a serial/parallel transforming operation upon the compressed data output from said code buffer memory;
   a gate circuit, operatively connected to said shift register and said ROM table, for masking the outputs of said shift register with the effective bit length data transmitted from said ROM table;
   an exclusive-OR circuit, operatively connected to said gate circuit and said ROM table, for comparing the outputs of said gate circuit with the compressed data transmitted from said ROM table; and
   a circuit, operatively connected to said exclusive-OR circuit, for storing the output of said exclusive-OR circuit.

3. A facsimile system for transmitting coded data and for receiving coded data, comprising:
   first means for generating video data comprising line data having white-to-black and black-to-white transitions;
   second means for receiving first run length data and for printing;
   third means, operatively connected to said first means and said second means, for receiving the video data and for generating second run length data, said third means including:
     a line memory for storing line data arranged as the first run length data;
     transition detecting means, operatively connected to said line memory, for detecting the white-to-black or black-to-white transitions in the line data stored in said line memory; and
     run length counting means, operatively connected to said transition detecting means, for counting a run length in the line data in dependence upon the output signals of said transition detecting means and for generating the second run length data;
   a ROM table, operatively connected to said third means, for storing compressed data corresponding to the second run length data and for providing the compressed data as an output;
   fourth means operatively connected to said ROM table and to said third means, and having first and second states, said fourth means for providing the compressed data as the coded data to be transmitted when said fourth means is in the first state and for providing the compressed data as ROM code data when said fourth means is in the second state; and
   fifth means, operatively connected to said third means and said fourth means, and operatively connected to receive the received coded data, for comparing the ROM code data with the received coded data when said fourth means is in the second state and for generating a matching signal when the ROM code data and the received coded data match, said third means simultaneously driving said run length counting means and said line memory when said fourth means is in the second state so as to write the first run length data into said line memory while said run length counting means is counting the run length and before said fifth means generates the matching signal.

4. A facsimile system as set forth in claim 3, wherein said first means comprises a scanning circuit.

5. A facsimile system as set forth in claim 3, wherein said fourth means comprises:
   means for providing a control signal;
   a multiplexer, operatively connected to said ROM table and said means for providing a control signal, said multiplexer having the first state or the second state in dependence upon the control signal;
   a code buffer memory, operatively connected to the multiplexer and operatively connected to receive the received coded data, for storing the coded data to be transmitted when the multiplexer is in the first state and for storing the received coded data when the multiplexer is in the second state; and a first shift register, operatively connected between said code buffer memory and said fifth means, for providing the received coded data to said fifth means when said multiplexer is in the second state.

6. The system as set forth in claim 5, wherein said ROM table provides effective bit length data, and wherein said fifth means comprises:

a second shift register, operatively connected to said first shift register, for performing a serial/parallel transforming operation upon the received coded data;

a gate circuit, operatively connected to said shift register and said ROM table, for masking the outputs of said second shift register with the effective bit length data provided by said ROM table;

an exclusive OR circuit, operatively connected to said gate circuit and said ROM table, for comparing the outputs of said gate circuits with the ROM table code data; and a storage circuit, operatively connected to said exclusive-OR circuit, for temporarily storing the output of said exclusive-OR circuit and for generating the matching signal.

* * * * *